United States Patent
Sakai et al.

(10) Patent No.: US 9,706,722 B2
(45) Date of Patent: Jul. 18, 2017

(54) PLANT GROWING DEVICE AND PLANT GROWING METHOD

(71) Applicant: PANASONIC INTELLECTUAL PROPERTY MANAGEMENT CO., LTD., Osaka (JP)

(72) Inventors: Ayumi Sakai, Aichi (JP); Hiroshi Yano, Osaka (JP); Sayaka Kato, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 14/774,774

(22) PCT Filed: Mar. 20, 2014

(86) PCT No.: PCT/JP2014/001611
§ 371 (c)(1),
(2) Date: Sep. 11, 2015

(87) PCT Pub. No.: WO2014/174757
PCT Pub. Date: Oct. 30, 2014

(65) Prior Publication Data
US 2016/0029580 A1 Feb. 4, 2016

(30) Foreign Application Priority Data

Apr. 22, 2013 (JP) .................. 2013-089442

(51) Int. Cl.
*A01G 31/00* (2006.01)
*A01G 31/02* (2006.01)
(52) U.S. Cl.
CPC ............ *A01G 31/02* (2013.01); *Y02P 60/216* (2015.11)

(58) Field of Classification Search
CPC ...... A01G 31/02; A01G 31/04; A01G 31/042; A01G 31/045; A01G 31/00
See application file for complete search history.

(56) References Cited

U.S. PATENT DOCUMENTS 2,993,300 A 7/1961 Sawyer
3,868,787 A 3/1975 Wong, Jr.
(Continued)

FOREIGN PATENT DOCUMENTS

BE 1005439 7/1993
DE 3016493 8/1981
(Continued)

OTHER PUBLICATIONS

Search Report issued in PCT/JP2014/001611 Patent Application No. , dated Jun. 24, 2014.
(Continued)

*Primary Examiner* — Kristen C Hayes
(74) *Attorney, Agent, or Firm* — Greenblum & Bernstein, P.L.C.

(57) ABSTRACT

A plant growing device includes: a container configured to reserve a nutrient solution in a lower portion of the container; a holding unit configured to hold plants inside the container; spray units configured to spray the nutrient solution toward the inside of the container; and support units configured to support the holding unit, and to move the holding unit to a position depending on how the spray units are driving, in a range from a spray region where the nutrient solution sprayed by the spray units is supplied to roots of the plants to an immersion region where the nutrient solution reserved in the container is supplied to the roots of the plants.

6 Claims, 3 Drawing Sheets

(56) References Cited

U.S. PATENT DOCUMENTS

| | | | | | |
|---|---|---|---|---|---|
| 4,521,989 | A | * | 6/1985 | Meyer | A01C 1/02 47/14 |
| 4,813,176 | A | * | 3/1989 | Takayasu | A01G 31/02 47/59 R |
| 8,677,685 | B2 | * | 3/2014 | Kao | A01G 31/02 47/62 R |
| 8,731,734 | B2 | * | 5/2014 | Hage | A01G 31/02 47/59 R |
| 9,433,159 | B2 | * | 9/2016 | Kao | A01G 31/02 |
| 2012/0023821 | A1 | * | 2/2012 | Kao | A01G 31/02 47/62 R |

FOREIGN PATENT DOCUMENTS

| | | |
|---|---|---|
| JP | 6-169660 | 6/1994 |
| JP | 2007-195514 | 8/2007 |
| JP | 2012-223127 | 11/2012 |
| WO | 2006/013853 | 2/2006 |

OTHER PUBLICATIONS

Written Opinion of the International Searching Authority and Translation thereof, dated Jun. 24, 2014.
International Search Report issued in E.P.O. Patent Application No. 14787750.0, dated Feb. 26, 2016.

\* cited by examiner

PLANT GROWING DEVICE AND PLANT GROWING METHOD

TECHNICAL FIELD

The present invention relates to a plant growing device and a plant growing method which hydroponically grow plants.

BACKGROUND ART

Solid substrate culture, hydroponic culture and the like are known as soilless culture for growing plants without using soil. Solid substrate culture cultivates plants using growth media as a plant support body, into which a nutrient solution infiltrates. Hydroponic culture cultivates plants with the roots of the plants directly soaked in a nutrient solution. Solid substrate culture includes urethane foam technique, rock wool technique and the like. Hydroponic culture includes deep flow technique, nutrient film technique and the like. In addition, hydroponic culture includes mist culture in which a nutrient solution is supplied to plants by spraying the nutrient solution onto the plants for the purpose of reducing the amount of nutrient solution to be supplied and the amount of water to be used (see PTL1, for example).

CITATION LIST

Patent Literature

[PTL1] Japanese Patent Application Publication No. 2012-223127

SUMMARY OF INVENTION

Technical Problem

Meanwhile, since the mist culture performs the cultivation using a small amount of nutrient solution, the mist culture involves the likelihood that once the electric power supply stops due to power failure or the like, the spray of the nutrient solution is halted, and the roots become dry and the plants accordingly wither.

The present invention has been made with the foregoing situation taken into consideration. An object of the present invention is to provide a plant growing device and a plant growing method which are capable of reducing the likelihood that plants wither.

Solution to Problem

For the purpose of attaining the foregoing object, a gist of a first aspect of the present invention is a plant growing device including: a container configured to reserve a nutrient solution in a lower portion of the container; a holding unit configured to hold a plant inside the container; a spray unit configured to spray the nutrient solution toward the inside of the container; and a support unit configured to support the holding unit, and to move the holding unit to a position depending on how the spray unit is driving, in a range from a spray region where the nutrient solution sprayed by the spray unit is supplied to a root of the plant to an immersion region where the nutrient solution reserved in the container is supplied to the root of the plant.

A plant growing device according to a second aspect of the present invention is the plant growing device according to the first aspect, characterized in that the plant growing device further includes: a power supply unit configured to supply electric power to the spray unit; and a power supply detection unit configured to detect how the power supply unit is supplying the electric power. The plant growing device is also characterized in that the support unit moves the holding unit depending on how the electric power is being supplied, which is detected by the power supply detection unit.

A plant growing device according to a third aspect of the present invention is the plant growing device according to the first or second aspect, characterized in that the support unit moves the holding unit such that the holding unit becomes situated in the spray region while the spray unit is driving, and the holding unit becomes situated in the immersion region while the spray unit is not driving.

A plant growing device according to a fourth aspect of the present invention is the plant growing device according to any one of the first to third aspects, characterized in that: the support unit includes a hydrostatic pressure mechanism; and while the spray unit is not driving, the support unit moves the holding unit using no electric power such that the holding unit becomes situated in the immersion region.

A plant growing device according to a fifth aspect of the present invention is the plant growing device according to any one of the first to fourth aspects, characterized in that the plant growing device further includes a water level adjusting unit configured to adjust a water level of the nutrient solution to be reserved in the container.

A gist of the sixth aspect of the present invention is a plant growing method characterized in that the plant growing method includes: causing a holding unit to hold a plant inside a container with a nutrient solution reserved in a lower portion of the container; causing a spray unit to spray the nutrient solution toward the inside of the container; while the spray unit is driving, moving the holding unit such that the holding unit becomes situated in a spray region where the nutrient solution sprayed by the spray unit is supplied to a root of the plant; and while the spray unit is not driving, moving the holding unit such that the holding unit becomes situated in an immersion region where the nutrient solution reserved in the container is supplied to the root of the plant.

DESCRIPTION OF EMBODIMENTS

Figure 1:
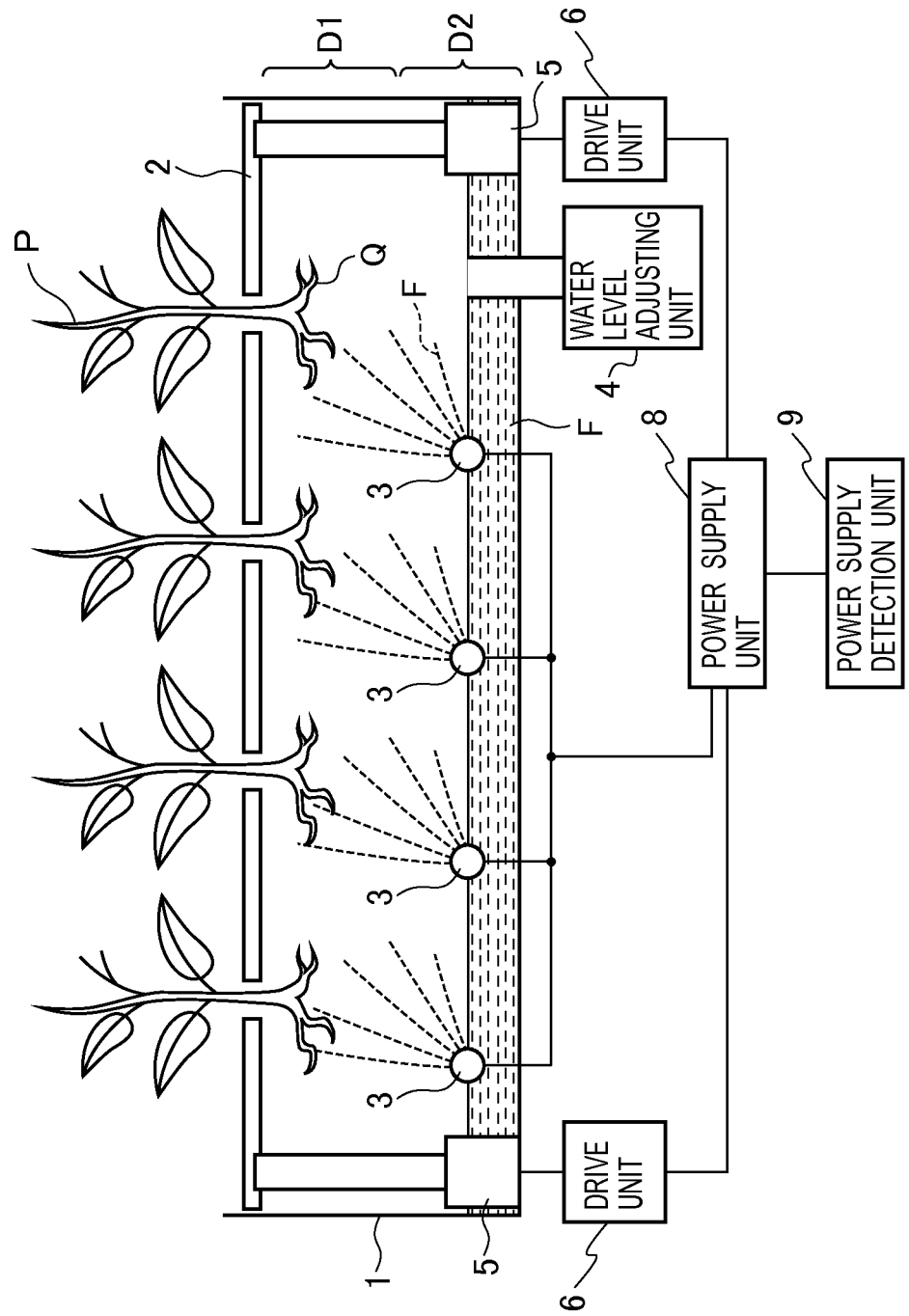
FIG. 1 is a schematic drawing for explaining a basic configuration of a plant growing device of an embodiment of the present invention.

Next, referring to the drawings, descriptions will be provided for an embodiment of the present invention. In the following drawings, the same or similar components are denoted by the same or similar reference signs. Duplicated descriptions for such components are omitted. It should be noted that: the following embodiment is shown as examples of a device and a method which represents the technical idea of the present invention; and the configuration of the following embodiment is not limited to the device or method shown as the examples of the embodiment. The technical idea of the present invention may be variously modified within a technical scope described in the scope of claims.

[Plant Growing Device]

As shown in FIG. 1, a plant growing device of the embodiment of the present invention includes: a container 1; a holding unit 2 configured to hold plants P; spray units 3; a water level adjusting unit 4; and support units 5 configured to support the holding unit 2. The holding unit 2, the spray units 3, the water level adjusting unit 4 and the support units 5 are placed inside the container 1.

The container 1 reserves a nutrient solution F inside its lower portion. The container 1 is, for example, a tank shaped like a rectangular parallelepiped, and the entire of the upper surface of the container 1 is open. The container 1 may be configured to include an inlet port and an outlet port such that the nutrient solution F is supplied to a lower portion of the container 1 from the outside through the inlet and outlet ports in a circulative manner, for example.

The holding unit 2 is supported by the support units 5 in a way that the holding unit 2 is situated inside the container 1. The holding unit 2 is a member shaped like a plate or a sheet, and having through-holes, for example. The through-holes of the holding unit 2 respectively hold the stalks of the plants P in a way that the upper portions of the plants P are separated from the lower portions of the plants P by the holding unit 2, for example. The upper portions of the plants P include the stalks, the leaves and the like of the plants P, while the lower portions of the plants P include the roots Q and the like of the plants P.

The spray units 3 spray the nutrient solution F toward the inside of the container 1 covered with the holding unit 2. The spray units 3 are placed on the water surface of the nutrient solution F reserved in the container 1, for example. The spray units 3 suck the reserved nutrient solution F, and spray the nutrient solution F upward. The spray units 3 may be instead configured to be supplied with the nutrient solution F from the outside, and to spray the nutrient solution F toward the inside of the container 1.

The water level adjusting unit 4 adjusts the water level of the nutrient solution F reserved in the container 1 at a predetermined water level. The water level adjusting unit 4 includes: an inlet port through which to introduce the nutrient solution F into the lower portion of the container 1; and an outlet port through which to discharge the nutrient solution F to the outside in order not to allow the water level of the nutrient solution F reserved in the container 1 to exceed the predetermined water level, for example.

Figure 2:
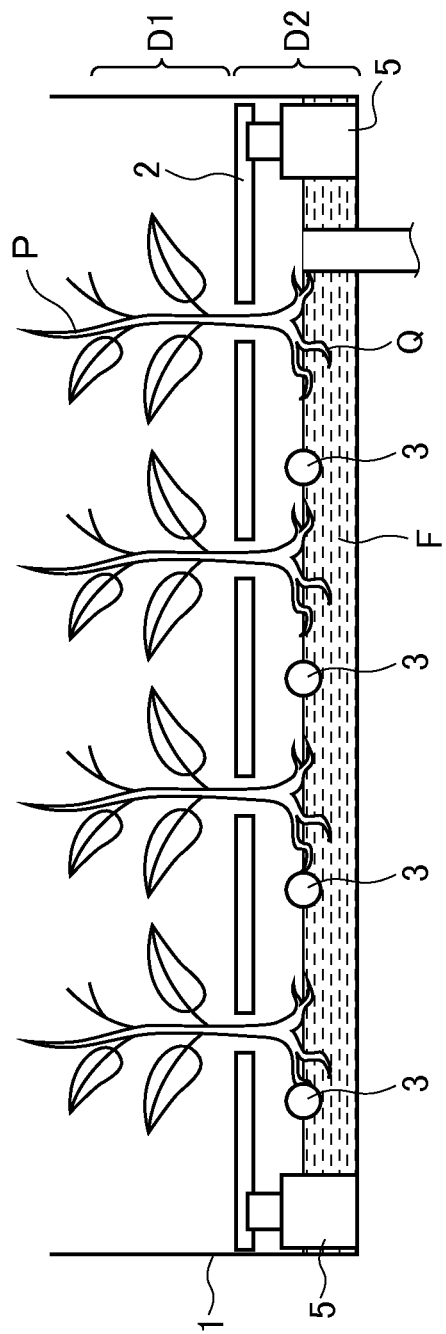
FIG. 2 is a schematic drawing for explaining how the plant growing device of the embodiment of the present invention works when electric power supply stops.

The support units 5 move the holding unit 2 depending on how the spray units 3 are driving. While the spray units 3 are driving normally, the support units 5 move the holding unit 2 such that the holding unit 2 becomes situated in a spray region D1 where the nutrient solution F sprayed by the spray units 3 is supplied to the roots Q of the plants P. While as shown in FIG. 2, the spray units 3 are not driving normally, the support units 5 move the holding unit 2 such that the holding unit 2 becomes situated in an immersion region D2 where the nutrient solution F reserved in the container 1 is supplied to the roots Q of the plants P.

As described above, the support units 5 move the holding unit 2 to a position depending on how the spray units 3 are driving, in a range from the spray region D1 to the immersion region D2. While the holding unit 2 is situated in the spray region D1, the roots Q of the plants P are supplied with the nutrient solution F which is sprayed by the spray units 3. While the holding unit 2 is situated in the immersion region D2, the roots Q of the plants P are supplied with the nutrient solution F which is reserved in the container 1.

The plant growing device of the embodiment of the present invention further includes: a drive unit 6 configured to drive the support units 5; a power supply unit 8 configured to supply electric power to the spray units 3, the water level adjusting unit 4 and the drive unit 6; and a power supply detection unit 9 configured to detect how the electric power supply unit 8 is supplying the electric power to the spray units 3. The spray units 3, the water level adjusting unit 4 and the drive unit 6 are driven by the electric power supplied from the power supply unit 8.

The drive unit 6 drives the support units 5 so as to make the support units 5 move the holding unit 2 depending on how the electric power is being supplied, which is detected by the power supply detection unit 9. In other words, once the supply of the electric power from the power supply unit 8 to the spray units 3 stops and the drive of the spray units 3 accordingly stops, the support units 5 move the holding unit 2 such that the holding unit 2 becomes situated in the immersion region D2.

The support units 5 and the drive unit 6 include a hydrostatic pressure mechanism, for example. In this case, the drive unit 6 includes a power source such as a pump or a compressor, while each the drive unit 6 includes a piston, and an actuator such as a pressure motor. The support units 5 and the drive unit 6 may instead include other mechanism such as an electrically-powered mechanism. In this case, the drive unit 6 is an actuator, such as an electric motor, which is installed in the support units 5.

The power supply unit 8 may be instead configured to supply the electric power to the spray units 3, the support units 5 and the drive unit 6 through the respective mutually-independent systems such that the drive unit 6 is capable of driving the support units 5 even when the supply of the electric power from the power supply unit 8 to the drive unit 6 stops. Otherwise, the drive unit 6 may be configured to be supplied with the electric power from an external device which is different from the power supply unit 8.

Since the plant growing device of the embodiment of the present invention changes the location of the holding unit 2 depending on how the spray units 3 are driving, the plant growing device is capable of reducing the likelihood that the plants wither even when the drive of the spray units 3 stops due to power failure or the like.

(Configuration of the Support Units and the Drive Unit)

A case where the support units 5 and the drive unit 6 have a pneumatic mechanism will be hereinbelow explained as an example of the configuration of the support units 5 and the drive unit 6 included in the plant growing device of the embodiment of the present invention.

Figure 3:
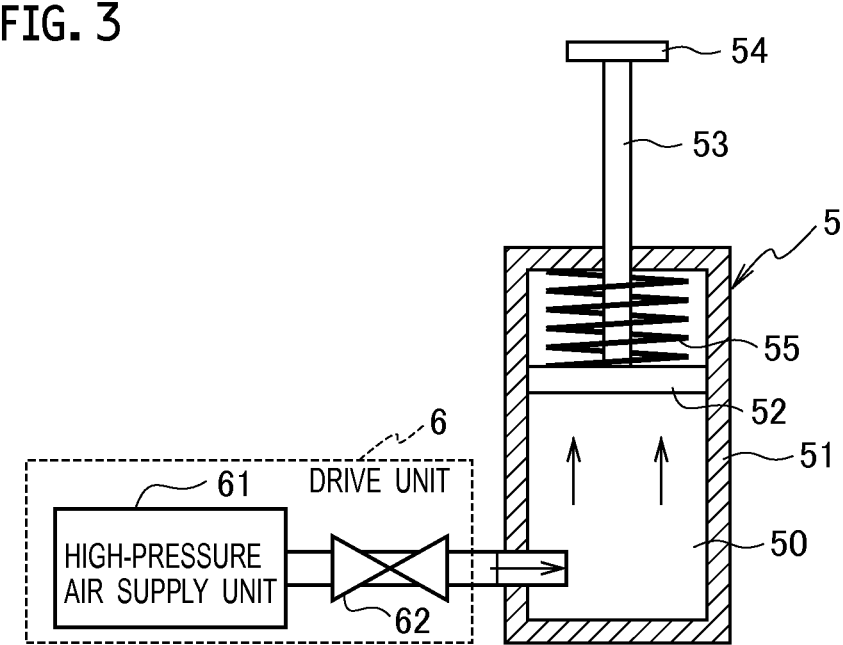
FIG. 3 is a diagram for explaining an example of a support unit included in the plant growing device of the embodiment of the present invention.

As shown in FIG. 3, each support unit 5 includes: a cylinder 51 shaped like a tube; a piston 52 disposed inside the cylinder 51 in a way that the piston 52 is capable of reciprocating; a piston rod 53 whose lower end side is connected to the piston 52; and a support plate 54 connected to the upper end side of the piston rod 53. The cylinder 51 extends in the vertical direction, and the two ends of the cylinder 51 are closed.

The piston 52 is a plate-shaped member which has a plane pattern corresponding to an inner diameter of the cylinder 51, for example. The piston 52 is disposed inside the cylinder 51 in a way that the inside of the cylinder 51 is divided into a cylinder chamber 50 into which the air is introduced and a space over the cylinder chamber 50. The upper surface of the piston 52, which is on a side opposite from the cylinder chamber 50, is connected to the piston rod 53.

The piston rod 53 is disposed in a way that the piston rod 53 penetrates through the upper end side of the cylinder 51 with the upper end side of the piston rod 53, which is connected to the support plate 54, located outside the cylinder 51. Each support unit 5 includes an elastic body 55 inside the cylinder 51. The elastic body 55 is disposed surrounding the piston rod 53.

The elastic body 55 is, for example, a spring which is wound surrounding the piston rod 53, and which is disposed in a way that the two end sides of the elastic body 55 press the upper end side of the cylinder 51 and the upper surface side of the piston 52, respectively, in directions in which the upper end side of the cylinder 51 and the upper surface side of the piston 52 go away from each other. In other word, the elastic body 55 makes downward elastic force act on the piston 52 in a way that the piston 52, the piston rod 53 and the support plate 54 move downward.

The lower surface side of the support plate 54 is connected to the upper end side of the piston rod 53, while the upper surface side of the support plate 54 supports the lower surface side of the holding unit 2.

The drive unit 6 includes a high-pressure air supply unit 61 and a normally-closed solenoid valve 62. The high-pressure air supply unit 61 drives by being supplied with electric power from the power supply unit 8. The high-pressure air supply unit 61 pressurizes, cleans and dries the air, and introduces the resultant high-pressure air into the cylinder chamber 50 through the normally-closed solenoid valve 62 from an inlet port formed in the cylinder 51. The normally-closed solenoid valve 62 drives by being supplied with electric power from the power supply unit 8, and accordingly turns into an open state.

While the power supply unit 8 is supplying the electric power, the drive unit 6 introduces the high-pressure air into the cylinder chamber 50 through the normally-closed solenoid valve 62 which is temporarily put in the open state. Thereby, the piston 52 moves upward, and the support plate 54 supports the holding unit 2 such that the holding unit 2 becomes situated in the spray region D1.

Figure 4:
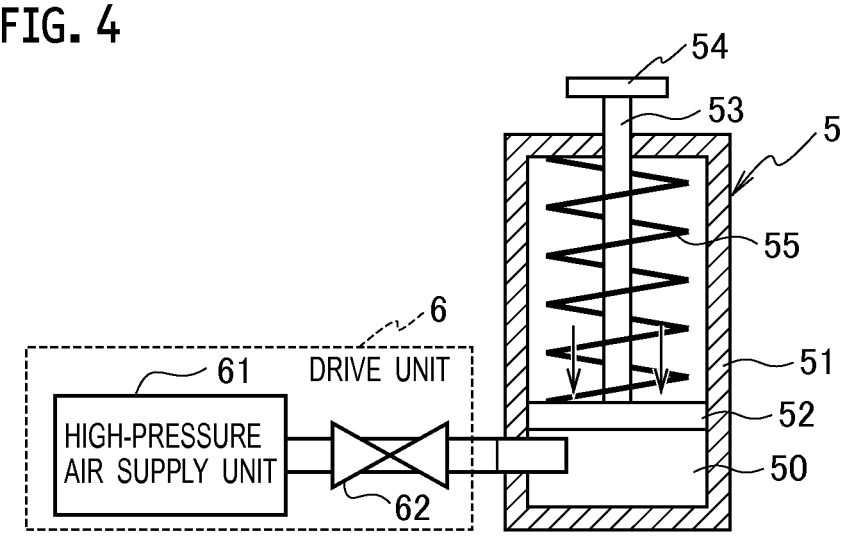
FIG. 4 is a diagram for explaining how the support unit included in the plant growing device of the embodiment of the present invention works when electric power supply stops.

While the power supply unit 8 is stopping the supply of the electric power, the drive unit 6 does not drive, and the normally-closed solenoid valve 62 is put in the closed state, as shown in FIG. 4. For this reason, no air is introduced into the cylinder chamber 50, and the piston 52 moves downward due to the elastic force of the elastic body 55. Accordingly, the support plate 54 supports the holding unit 2 such that the holding unit 2 becomes situated in the immersion region D2.

Since the support units 5 and the drive unit 6 have the foregoing configuration, the support units 5 and the drive unit 6 are capable of moving the holding unit 2 using no electric power such that the holding unit 2 becomes situated in the immersion region D2, even when the supply of the electric power stops. Consequently, it is possible to reduce the likelihood that the plants wither.

Other Embodiments

Although the foregoing descriptions have been provided for the embodiment of the present invention, the statements and the drawings which are part of this disclosure shall not be construed as limiting the present invention. This disclosure will make various alternative embodiments, examples and operation techniques clear to those skilled in the art.

In the above-described embodiment, the power supply detection unit 9 may be configured, for example, to store the electric power by being supplied with the electric power from the power supply unit 8, and to supply the stored electric power to the support units 5 and the drive unit 6 when the power supply unit 8 stops.

Furthermore, it is a matter of course that the present invention includes various embodiments and the like, which have not been described herein, such as configurations and the like resulting from application of the embodiment of the present invention and its modifications. Accordingly, the technical scope of the present invention shall be determined only based on the matter to define the invention relating to the scope of claims, which is judged as appropriate from the foregoing descriptions.

All the contents of Japanese Patent Application No. 2013-089442 (filed on Apr. 22, 2013) are incorporated herein by reference.

INDUSTRIAL APPLICABILITY

The present invention is capable of providing a plant growing device and a plant growing method which reduces the likelihood that plants wither.

REFERENCE SIGNS LIST 1 container
2 holding unit
3 spray unit
4 water level adjusting unit
5 support unit
8 power supply unit
9 power supply detection unit

The invention claimed is:
1. A plant growing device comprising:
   a container configured to reserve a nutrient solution in a lower portion thereof;
   a holding unit configured to hold a plant inside the container;
   a spray unit configured to spray the nutrient solution toward the inside of the container; and
   a support unit configured to support the holding unit, and to move the holding unit to a position depending on how the spray unit is driving, in a range from a spray region where the nutrient solution sprayed by the spray unit is supplied to a root of the plant to an immersion region where the nutrient solution reserved in the container is supplied to the root of the plant.
2. The plant growing device according to claim 1, further comprising:
   a power supply unit configured to supply electric power to the spray unit; and
   a power supply detection unit configured to detect how the power supply unit is supplying the electric power, wherein
   the support unit moves the holding unit depending on how the electric power is being supplied, which is detected by the power supply detection unit.
3. The plant growing device according to claim 1, wherein
   the support unit moves the holding unit such that the holding unit becomes situated in the spray region while the spray unit is driving, and the holding unit becomes situated in the immersion region while the spray unit is not driving.

4. The plant growing device according to claim 1, wherein
the support unit includes a hydrostatic pressure mechanism, and
while the spray unit is not driving, the support unit moves the holding unit using no electric power such that the holding unit becomes situated in the immersion region.

5. The plant growing device according to claim 1,
further comprising a water level adjusting unit configured to adjust a water level of the nutrient solution to be reserved in the container.

6. A plant growing method comprising:
causing a holding unit to hold a plant inside a container with a nutrient solution reserved in a lower portion of the container;
causing a spray unit to spray the nutrient solution toward the inside of the container;
while the spray unit is driving, moving the holding unit such that the holding unit becomes situated in a spray region where the nutrient solution sprayed by the spray unit is supplied to a root of the plant; and
while the spray unit is not driving, moving the holding unit such that the holding unit becomes situated in an immersion region where the nutrient solution reserved in the container is supplied to the root of the plant.

* * * * *